No. 766,096. PATENTED JULY 26, 1904.
V. BERTOLINI.
EYEGLASSES.
APPLICATION FILED JAN. 23, 1903. RENEWED APR. 22, 1904.
NO MODEL.
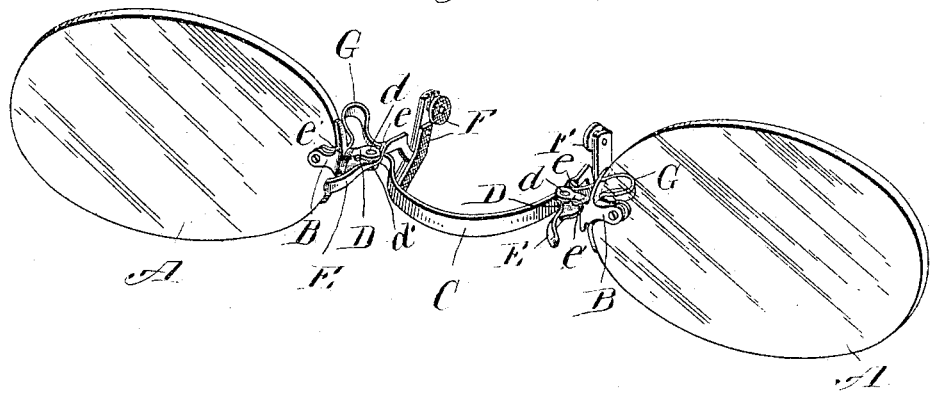
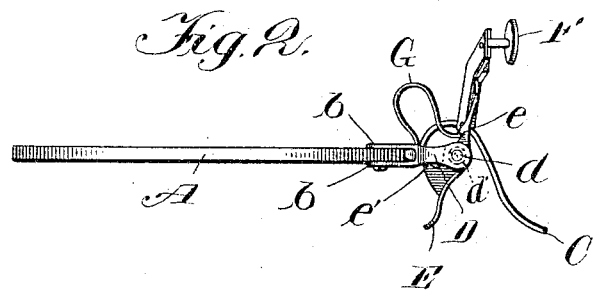
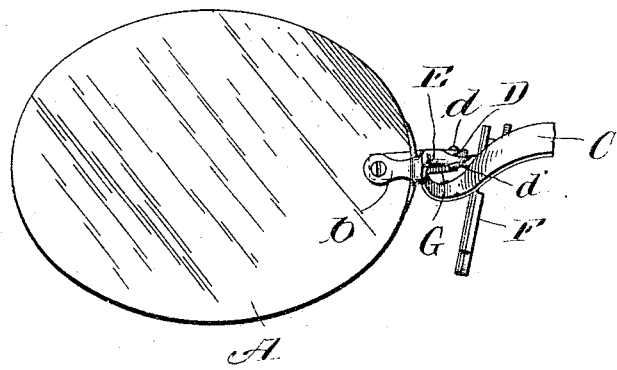
Witnesses:
H. S. Gaither
H. M. McDonell
Inventor:
Vincent Bertolini
by L. W. Hopkins
Attorney No. 766,096. Patented July 26, 1904.

UNITED STATES PATENT OFFICE.

VINCENT BERTOLINI, OF CHICAGO, ILLINOIS, ASSIGNOR TO F. A. HARDY & CO., OF CHICAGO, ILLINOIS, A CORPORATION.

EYEGLASS.

SPECIFICATION forming part of Letters Patent No. 766,096, dated July 26, 1904.

Application filed January 23, 1903. Renewed April 22, 1904. Serial No. 204,425. (No model.)

*To all whom it may concern:*

Be it known that I, VINCENT BERTOLINI, a citizen of the United States, residing at Chicago, in the county of Cook and State of Illinois, have invented certain new and useful Improvements in Eyeglasses, of which the following is a specification.

The present invention relates to that class of eyeglasses in which the lens-mountings are connected by means of a bridge which is inflexible or practically inflexible under ordinary conditions. The advantage of such a bridge is that it maintains the lenses in their proper relative positions, and hence overcomes the objection most frequently urged against eyeglasses of ordinary construction—namely, the impossibility of maintaining the axes of the lenses in the intended and proper relative positions. For example, in order to correct errors in vision due to astigmatism it is necessary to use cylindrically-ground lenses and the longitudinal axes of the cylinders must bear certain relations to the eyes. The lenses may be accurately ground to meet the requirements; but still when mounted in eyeglasses of customary construction and upon the patient the relative positions of the lenses may owing to the elasticity of the bow-spring be out of proper positions relatively to the eyes.

Preferably I use what is known as a "saddle-bridge," such as is ordinarily used for spectacles and is adapted to rest directly upon the bridge of the nose; but I desire to have it understood that the invention is not limited to a bridge of this particular type, but comprehends a bridge of any type that will meet the requirements.

I desire to have it understood also that the invention is applicable to eyeglasses having what are known as "skeleton" mountings and also to eyeglasses in which the lenses are mounted in rims, and the term "mounting" as herein used is intended to comprehend both of these styles, although I have selected a skeleton mounting for the purpose of illustration, since the invention is particularly applicable to eyeglasses of this type.

For holding the glasses in place on the nose I use guards consisting of pads (which may be of any desired construction) adapted to contact with the nose, levers carrying the pads, and springs exerting their pressure upon the levers for forcing the pads against the nose, and the invention resides in the herein-described novel construction and arrangement of these parts.

In order to be commercially successful, it is necessary that the glasses be not only operative for the purpose intended, but also neat in appearance and inconspicuous. To these ends I have so constructed and arranged the parts that to a casual observer the glasses will not appear conspicuously unlike glasses of the types now customarily used and considered conventional.

In the accompanying drawings, which are made a part of this specification, Figure 1 is a perspective view of a pair of eyeglasses embodying the invention. Fig. 2 is a plan view of one-half thereof, on a larger scale. Fig. 3 is a front elevation thereof.

A represents the lenses, B the mountings, and C the saddle-bridge, the ends of which are permanently secured to the mountings.

From each of the mountings a single bracket D projects inward horizontally and carries a downwardly-projecting pin *d*, upon which is fulcrumed a lever E, which crosses the vertical plane of the lens. The rearwardly-projecting arm of the lever carries the pad or pads F and the forwardly-projecting arm is fashioned to receive pressure of the thumb or finger. Preferably it is bent outward or toward the lens, so that the thumb or finger will not slip off when the pressure is applied.

The bracket is located far enough above the end of the saddle-bridge to allow sufficient space between them for the lever.

G is a spring of substantially U shape, made independent of the lever and of a separate piece of metal. One end of it is permanently secured to the mounting and the other end impinges against a shoulder *e* on the rear arm of the lever with a constant tendency to force the pad inward. In order that this tendency shall be constant, to the end that the pressure shall be effective throughout the entire range of movement, the spring is put under an initial tension in the process of assembling the parts and a stop is provided for limiting the movement of the lever under the influence of the spring. This stop may consist of a shoulder e' on the forwardly-projecting arm of the lever so arranged that it will contact with the mounting. The spring being located in rear of the plane of the lenses and also in the horizontal plane of the lever is practically hidden, and hence does not detract from the neat appearance of the glasses. This is especially true if a skeleton mounting such as shown in the drawings be used. The spring is then located in the horizontal plane of the perforated ears b of the mounting and directly behind them, so that when viewed from a position directly in front of the glasses the spring cannot be seen. It will be observed that the spring has frictional contact with the lever without being rigidly attached thereto, and this has the advantage of allowing the inner arm of the lever to move through the entire range of its permitted movement, even to a position in contact and substantially parallel with the adjacent side of the spring, without producing a sharp bend in the latter at any point. It will be observed also that the spring contacts with the lever at a point between its fulcrum and its rear end, and this converts the rear arm of the lever into a secondary lever of the third order, (so far as the clamping action is concerned,) the resistance-arm of which is shortened in proportion to the distance of said point of contact from the fulcrum. This has the effect of giving the spring a maximum efficiency in forcing the pads against the nose.

The lever is directly supported by a shoulder resulting from an enlargement at the lower end of its pivot.

What I claim as new, and desire to secure by Letters Patent, is—

1. The combination with the lenses and lens-mountings, of a practically inflexible bridge having its ends secured to the mountings, levers crossing the vertical plane of the lenses, pads carried by the rearwardly-projecting arms of the levers, the forwardly-projecting arms of the levers being fashioned to receive pressure of the thumb and finger, and substantially U-shaped independent springs located in rear of the vertical plane of the lenses and in the horizontal plane of the levers, and exerting their pressure upon the levers between their fulcrums and rear ends, substantially as set forth.

2. The combination with the lenses and lens-mountings, of a practically inflexible bridge having its ends secured to the mountings, levers crossing the vertical plane of the lenses, pads carried by the rearwardly-projecting arms of the levers, U-shaped springs located in rear of the vertical plane of the lenses and interposed between the mountings and the rear arms of the levers each of said springs being permanently attached at one end and at the other end having frictional contact with the coöperating part, substantially as set forth.

3. The combination with the lenses and lens-mountings, of a practically inflexible bridge having its ends secured to the mountings, a single horizontal bracket projecting inward from each mounting at a point above the adjacent end of the bridge, levers lying against the under sides of said bracket and crossing the vertical plane of the lenses, pivots projecting downward from the brackets and having shoulders for supporting the levers, pads carried by the rearwardly-projecting arms of the levers, and substantially U-shaped independent springs interposed between the mountings and the rear arms of the levers, said springs being located in rear of the vertical plane of the lenses and in the horizontal plane of the levers, substantially as set forth.

4. The combination with the lenses and lens-mountings, of a practically inflexible bridge having its ends secured to said mountings, horizontal levers crossing the vertical plane of the lenses, pads carried by the rearwardly-extending arms of the levers, and substantially U-shaped springs located in rear of the vertical plane of the lenses and in the horizontal plane of the levers, one end of each of said springs being permanently secured to one of said mountings while its other end has frictional contact with the rear arm of one of said levers, substantially as set forth.

5. The combination with the lenses and lens-mountings, of a practically inflexible bridge having its ends secured to said mountings, horizontal levers crossing the vertical plane of the lenses, pads carried by the rearwardly-projecting arms of the levers, substantially U-shaped independent springs located in rear of the vertical plane of the lenses and interposed between the mountings and the rear arms of the levers, and stops for limiting the movement of the levers under the influence of the springs and maintaining said springs under an initial tension, substantially as set forth.

6. The combination with the lenses and lens-mountings, of substantially U-shaped springs located in rear of the vertical plane of the lenses, each of said springs being secured to one of the mountings, levers crossing the vertical plane of the lenses, and having shoulders e' against which the free ends of the springs have frictional contact and pads carried by the rearwardly-projecting arms of the levers, substantially as set forth.

7. The combination with the lenses and lens-mountings having ears perforated for the passage of the lens-screws, a practically inflexible bridge having its ends secured to said mountings, brackets projecting inward from said mountings, vertical pivots projecting downward from said brackets, horizontally-disposed levers fulcrumed upon said pivots and crossing the vertical plane of the lenses, pads carried by the rearwardly-extending arms of the levers, and springs of substantially U shape located in rear of the vertical plane of the lenses and in the horizontal plane of said ears, one end of each of said levers being permanently attached to one of said mountings, the rear arms of said levers having shoulders with which the free ends of said springs have frictional contact, and the forwardly-projecting arms of said levers having shoulders $e'$ forming stops, substantially as set forth.

8. In eyeglasses, the combination with the lenses, the bridge, and the nose-guards pivotally supported at the ends of the bridge and crossing the vertical plane of the lenses, of independent springs for the nose-guards rigidly supported at the ends of the bridge, and extending at right angles to the plane of the lenses, and exerting their pressure between the fulcrum and the rear ends of the nose-guards, substantially as described.

VINCENT BERTOLINI.

Witnesses:
EDWARD B. MORSE,
E. O. TROEGER.